United States Patent [19]

LaPlante et al.

[11] Patent Number: 5,757,842
[45] Date of Patent: May 26, 1998

[54] METHOD AND APPARATUS FOR COMPENSATING THERMAL LENSING EFFECTS IN A LASER CAVITY

[75] Inventors: Mark J. LaPlante, Walden; David C. Long, Wappingers Falls; Scott M. Mansfield, Hopewell Junction, all of N.Y.

[73] Assignee: International Business Machines Corporation, Armonk, N.Y.

[21] Appl. No.: 672,288

[22] Filed: Jun. 28, 1996

[51] Int. Cl.$^6$ ........................................ H01S 3/08
[52] U.S. Cl. .................... 372/98; 372/103; 372/107; 372/92; 372/101
[58] Field of Search ................... 372/98, 101, 103, 372/92, 107

[56] References Cited

U.S. PATENT DOCUMENTS

| | | |
|---|---|---|
| 4,848,881 | 7/1989 | Kahan et al. |
| 5,172,388 | 12/1992 | Long ........................... 372/70 |
| 5,233,624 | 8/1993 | LaPlante et al. ............. 372/98 |
| 5,237,584 | 8/1993 | Shannon et al. |
| 5,283,796 | 2/1994 | Fink .............................. 372/98 |
| 5,329,544 | 7/1994 | Shachrai et al. ............. 372/98 |
| 5,406,577 | 4/1995 | Gagosz ........................ 372/69 |

*Primary Examiner*—Leon Scott, Jr.
*Attorney, Agent, or Firm*—DeLio & Pterson, LLC; Peter W. Peterson; Aziz M. Ahsan

[57] ABSTRACT

In a laser cavity having an optical axis, a laser medium for forming a laser beam, the laser medium having a central axis off-set from the optical axis, the laser medium exhibiting focusing characteristics that vary with changes in optical power pumped into the laser medium, at least one pair of mirrors oppositely positioned for reflecting at least a portion of the laser beam, one of the mirrors being an output coupler, the laser cavity further comprising at least one focusing element having a central axis positioned between one of the mirrors and the laser medium such that the central axis of the focusing element is displaced from the optical axis a distance that is a function of the displacement of the laser medium central axis from the optical axis and the optical axis passes through the focusing element to substantially eliminate lensing effects produced by the laser medium.

69 Claims, 7 Drawing Sheets

—·— Resonator Axis
——— Rod Axis

----- Resonator Axis
--- Rod Axis
-·- Lens Axis

Laser Rod

METHOD AND APPARATUS FOR COMPENSATING THERMAL LENSING EFFECTS IN A LASER CAVITY

BACKGROUND OF THE INVENTION

1. Field of the Invention

The present invention relates generally to method and apparatus for providing compensation for thermal lensing in an off-axis laser cavity.

2. Problem to be Solved

Many commercial and military laser applications rely on delivering an intense laser beam to a target that is a great distance from the laser source. Other applications, such as laser cutting and drilling, rely on focusing an intense laser beam to a small spot to increase the laser power density and minimize the width of the cut. For all of these applications, it is critical that the lasing medium be efficiently pumped with energy or excited and that the beam divergence be kept small. Many factors can increase the beam divergence but most can be eliminated through proper design of the laser cavity. One factor that is difficult to control is the effect of thermal gradients in the laser medium, i.e. thermal lensing. Thermal lensing can degrade the laser beam quality and can cause the beam to diverge as it travels away from the laser source. It can also widen the size of the spot to which the beam can be focused, thereby reducing the power density of the focused beam. For these reasons, various conventional methods and apparatuses have been used to efficiently pump lasers to get the maximum output from the laser medias and to cool the lasing media to control thermal lensing effects.

For example, DiCurcio U.S. Pat. No. 3,311,844 discloses a "high-speed" pulsed laser system that uses multiple rods that are secured to the periphery of a wheel. The rods are rotated into a laser cavity and pulsed pumped and fired. However, "high-speed" for this system is 1 Hz with very high power. This patent also discloses cooling the laser rods by a method of selective indexing and the use of multiple pumping lamps to pulse pump one or more laser rods in the pumping chamber. These pumping lamps are flashed in coordination with the passage of the rods through the pumping chamber to deliver pumping energy to the rod in the chamber. The lamps are fired sequentially to avoid excessive heat build-up in any one lamp. If it is desired to cool each laser rod after the rod has been pulsed, one or more cooling devices such as fans or blowers are placed around the periphery of the system to deliver a flow of cooling air to cool the laser rods after they have been pulsed.

Byer U.S. Pat. No. 4,555,786 discloses another high power solid state laser wherein the motion of the laser medium is solely for the purpose of thermal load distribution. Reference is made to a spinning glass disk or slab. Moving the lasing medium effects a reduction in thermal stress in the glass disk or slab to keep it from breaking. This patent also discloses that the lasing slab or disk can be cooled by using a film of an index matching fluid wherein the film is applied to the surface of the rotating lasing disk to transfer heat from the rotating disk or slab to a cooling sheet or plate.

Mandella U.S. Pat. No. 4,567,597 discloses a laser system having a stationary lasing region. The lasing medium is rotated to bring thermally cooled unpumped portions into the lasing cavity and where it is pumped and then allowed to lase. The lasing media is then rotated out of the lasing cavity so that heat is transferred out of the cylinder to the surroundings. This patent also discloses a laser rod in the shape of a hollow cylinder that is rotated so that the cooled and non-excited region is brought into the resonator cavity and allowed to lase. The fired portion of the hollow laser rod is then rotated out so that heat is transferred out of the hollow cylinder to the surroundings.

Martin U.S. Pat. No. 4,575,854 discloses another unique pumping scheme for Nd:YAG lasers. Instead of using an arc lamp, a bank of laser diode arrays or an array of laser diodes surrounds the cylindrical rod. These laser diode arrays are sequentially pulsed to provide CW pumping, by insuring that at least one diode array is on while the others are off. Each diode array actually operates at quite a low duty-cycle for cooling purposes. The stationary Nd:YAG laser rod is pumped by the surrounding array of diode laser bars, which are electronically fired in rotation.

Hoffman U.S. Pat. No. 4,845,721 discloses a solid state laser rod having internal bores through which a coolant can flow. Hoffman also discloses rotating the rod so that only specific portions of the laser materials are subjected to pumping while other portions are cooling. This patent also describes means by which solid-state laser media can be cooled through special designs/shapes of the actual material. These designs facilitate laser cooling by increasing surface area for heat extraction. Reference is made to a tubular shaped rod (empty cylinder) which is rotated into the resonator pumping region, however, this is done solely for cooling purposes.

Basu et al. U.S. Pat. No. 4,890,289 discloses a rotating disk laser which is optically pumped by a source positioned off center from the axis of rotation of the lasing disk. This patent describes both rotation or translation of the lasing medium for the purpose of thermal load distribution. Reducing the thermal effects caused by lamp pumping is the main purpose of this patent. It incorporates diode-pumping with delivery of that radiation via fiber optics. Additionally, the rotation of the medium is solely for the purpose of reducing thermal stress in the medium.

Other methods and apparatus have been used to compensate for thermal lensing effects rather than eliminate them. For example, Kahan et al. U.S. Pat. No. 4,848,881 discloses a variable lens and birefringence compensator which is adapted to be used in a repetitively pulsed, variable rate, solid state laser. This patent describes a cylindrical body of optical material having a temperature dependent index of refraction that is thermally coupled to a heat exchange means and heat sink that either adds heat or extracts heat from the optical material. In this way, radially dependent thermal and stress gradients can be established in the optical material and can be varied as needed. The thermal gradient can be used to create a lens that compensates for the lensing of the laser rod and the stress gradients can be used to correct for birefringence in the laser rod.

Shannon et al. U.S. Pat. No. 5,237,584 discloses an apparatus for providing a laser beam that is scalable to very high output power by using approximately identical optical sections, each section containing one or more laser gain media and one or more fold mirrors. The laser gain media and/or the fold mirrors have curved surfaces that are chosen to provide a stable optical system within each optical section and to compensate for thermal lensing.

Other laser applications rely on creating laser pulses at a high rate of repetition, but with constant power per pulse. All lasing media have a characteristic time that it takes to fully recharge or re-excite the media so that it can lase after it has been discharged by the creation of the laser pulse. If the media is not fully charged before another pulse is created, then that pulse will not have the maximum amount of power that it could. Furthermore, if the time between pulses is allowed to be less than the characteristic pumping time and is allowed to vary, then the pulse power will vary. This is not desirable for applications, such as laser drilling, where the amount of power per pulse needs to be kept constant in order to control the amount of material removed, but the time between pulses needs to be varied in order to best control the position of the hole.

Long et al. U.S. Pat. No. 5,172,388 discloses a method to increase the pulse repetition rate of a laser while maintaining a constant pulse power. Specifically Long et al. discloses a solid state lasing rod that is spun at high rates of speed on its long axis. The rod is larger in size than the size of the aperture through which the lasing beam passes so that the laser beam can be off-centered from the rod axis. The beam of light that passes through this off-axis aperture is reflected back through the aperture and the rod by mirrors placed on either side of the rod forming a laser resonator. The beam is amplified with each pass through the rod. The spinning rod increases the laser repetition rate because as the rod spins, the area of the rod that is not releasing photons or not lasing is being charged or pumped with photons so that each area that lases is fully charged when it is rotated to lase through the aperture. For this method to work properly, the laser rod must have ends that are polished with a radius of curvature that corrects for the thermal lensing of the rod. This type of thermal lensing correction only works for a small range of pumping power so that the laser output power cannot be easily varied.

LaPlante et al. U.S. Pat. No. 5,233,624 discloses a spinning beam steering assembly (SBSA) that is spun at high rates of speed on its axis. The SBSA offsets the lasing optical path and causes the lasing path to be swept through a circular region of the lasing medium. The off-axis beam of light swept by one or more SBSA is reflected back through the one or more SBSA and the lasing medium by mirrors that are aligned to form a laser resonator. The beam is amplified by each pass through the lasing medium and then transmitted through at least one end mirror. The SBSA increases the laser repetition rate because as the SBSA spins, the swept area of the lasing medium that is not releasing energy by lasing is being charged or pumped with energy so that each area that lases is fully charged when it is allowed to lase through the SBSA. As with the spinning rod system, this method only works properly if the laser media is properly shaped to compensate for the thermal lensing in the media and does not allow for variation in the laser output power.

Therefore, an object of this invention is to provide new and improved off-axis laser systems having an increased pulse repetition rate that substantially eliminate thermal lensing effects.

Another object of this invention is to provide a new and improved off-axis laser system having an increased pulse repetition rate that utilizes at least one spinning solid state laser rod and which substantially eliminates thermal lensing effects.

A further object of this invention is to provide a new and improved off-axis laser system having an increased pulse repetition rate that utilizes at least one spinning aperture and which substantially eliminates thermal lensing effects.

Another object of this invention is to provide a relatively large diameter laser medium to effect proportionally higher repetition rates or lower rotational speeds.

Another object of this invention is to utilize most of the volume of the laser medium while maintaining a gaussian beam profile.

It is yet another object of this invention is to achieve greater CW laser output with a gaussian beam profile.

Still other objects and advantages of the invention will in part be obvious and will in part be apparent from the specification.

SUMMARY OF THE INVENTION

The present invention provides a method and laser system that compensates for a variable amount of thermal lensing that is introduced when a laser beam is passed through a lasing medium and is displaced from the central axis of the lasing medium. The method and apparatus of the present invention requires one or more focusing elements or lenses in the laser resonator such that the central axis of these focusing elements is displaced from the optical axis of the resonator by a distance that is proportional to or a function of the displacement of the central axis of the lasing medium from the optical axis of the resonator. The optical axis of the resonator is typically defined by the two end mirrors and an aperture. The method and laser apparatus of the present invention provides thermal lensing correction that improves and simplifies the operation of lasers that use a laser medium with a central axis that is offset from the optic axis of the laser resonator, such as the increased pulse repetition rate lasers disclosed in Long et al. and commonly owned U.S. Pat. Nos. 5,172,388 and 5,233,624.

The method and apparatus of the present invention provides thermal lensing correction for a laser cavity that displaces the laser medium from the optic axis of the resonator by a distance that is greater than half of the beam diameter while maintaining a constant laser output power. Additionally, the thermal lensing correction improves the quality of the output beam by correcting for the off-axis aberrations introduced by the off-axis lasing medium. The lasing medium does not need to be pre-shaped to compensate for any thermal lensing. However, pre-shaped media can still be used in conjunction with the off-axis correction and in some cases may be desirable.

The method and laser apparatus of the present invention also provides thermal lensing correction or compensation that can be adjusted to account for varying degrees of thermal lensing. In a preferred embodiment, this is accomplished by a simple linear translation of one or more of the focusing elements or lenses. The degree of thermal lensing introduced by an off-axis lasing medium will vary depending on several factors including the amount of energy that is being used to charge or pump the lasing medium and the efficiency of the system used to cool the lasing medium.

The present invention also provides some correction for varying amounts of aberrations, such as astigmatism, introduced by an off-axis lasing medium. This is accomplished by a simple rotation of one or more of the focusing elements.

In one aspect, the present invention is directed to a laser cavity having an optical axis, a laser medium for forming a laser beam, the laser medium having a central axis off-set from the optical axis, the laser medium exhibiting focusing characteristics that vary with changes in optical power pumped into the laser medium, at least one pair of mirrors oppositely positioned for reflecting at least a portion of the laser beam, one of the mirrors being an output coupler, the laser cavity further comprising at least one focusing element having a central axis positioned between one of the mirrors and the laser medium such that the central axis of the focusing element is displaced from the optical axis a distance that is a function of the displacement of the laser medium central axis from the optical axis and the optical axis passes through the focusing element to substantially eliminate lensing effects produced by the laser medium.

In a related aspect, the present invention is directed to a laser cavity, comprising:
- a) a laser rod for forming a laser beam, the laser rod having a rotational axis and a laser beam optical axis, the optical axis being set-off from the rotational axis by at least one laser beam radius;
- b) an optical pumping source for optically pumping at least a portion of the laser rod;
- c) a device for rotating the laser rod;
- d) at least one pair of oppositely positioned mirrors for reflecting at least a portion of the laser beam, one of the mirrors being an output coupler;
- e) at least one aperture defining the diameter of the laser beam;
- g) at least one focusing element positioned between one of the mirrors and the laser rod such that its central axis is displaced from the optical axis a distance that is a function of the displacement of the laser rod rotational axis from the optical axis; and
- h) wherein the optical axis passes through the center of the aperture, the mirrors and the focusing element to form a laser resonator.

In a further aspect, the present invention is directed to a laser cavity having an optical axis, comprising:
- a) at least one laser medium having a central axis, the laser medium forming a laser beam having a laser beam axis;
- b) at least one means for pumping at least a portion of the laser medium wherein the pumping causes a population inversion in at least a portion of the laser medium;
- c) at least one aperture for defining an allowable laser beam path that is smaller than the cross-section of the laser medium;
- d) a device for sweeping the allowable laser beam path through the population inverted region of the laser medium;
- e) a pair of oppositely positioned mirrors for reflecting a portion of the laser beam, one of the mirrors being an output coupler; and
- f) at least one focusing element having a central axis positioned between one of the mirrors and the laser medium such that the central axis of the focusing element is displaced from the optical axis a distance that is a function of the displacement of the laser medium central axis from the optical axis and the optical axis passes through the focusing element to substantially eliminate lensing effects produced by the laser medium;
- g) wherein the laser beam passes through the aperture, partially reflects off a portion of each mirror during the sweeping of the population inversion region of the laser medium and passes through the focusing element.

In another aspect, the present invention is directed to a method of operating a laser cavity, comprising the steps of:
- a) rotating a laser rod having an optical axis and a rotational axis, the optical axis being displaced from the rotational axis by at least one radius of a laser beam;
- b) optically pumping at least a portion of the rotating laser rod such that a portion of the laser rod is lasing and forming the laser beam while at least a portion of a non-lasing portion of the rotating laser rod is being optically pumped;
- c) reflecting at least a portion of the laser beam with at least a pair of mirrors, one of the mirrors being an output coupler mirror; and
- d) allowing the reflected laser beam to pass through at least one exit aperture and at least one focusing element positioned between one of the mirrors and the laser rod, the focusing element having a central axis and being displaced from the optical axis a distance that is a function of the displacement of the laser rod central axis from the optical axis, the focusing element substantially eliminating lensing effects produced by the laser rod.

In a further aspect, the present invention is directed to a method of operating a laser cavity comprising the steps of:
- a) rotating at least one spinning beam steering assembly having an offset axis and a rotational axis wherein the offset axis is displaced from the rotational axis by at least one radius of a laser beam;
- b) pumping at least a portion of a laser medium to effect a population inversion in at least a portion of the laser medium and wherein at least a portion of the laser medium is lasing and forming the laser beam, while at least a portion of a non-lasing portion of the laser medium is being pumped to cause the population inversion;
- c) defining with an aperture an allowable laser beam path that is smaller than the cross-section of the laser medium;
- d) reflecting at least a portion of the laser beam with at least a pair of mirrors, one of the mirrors being an output coupler mirror; and
- e) allowing the reflected laser beam to pass through at least one exit aperture and a focusing element positioned between one of the mirrors and the laser medium, the focusing element having a central axis and being displaced from the optical axis a distance that is a function of the displacement of the laser medium central axis from the optical axis, the focusing element substantially eliminating lensing effects produced by the laser medium.

These and other objects and aspects of the invention will become more apparent after referring to the following description considered in conjunction with the accompanying drawings.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS

In describing the preferred embodiment of the present invention, reference will be made herein to FIGS. 1–9 of the drawings in which like numerals refer to like features of the invention.

The laser system of the present invention compensates for thermal lensing by utilizing one or more off-axis focusing elements or lenses in the laser cavity. The degree of thermal lensing correction is adjusted by moving the lens either closer to or farther away from, respectively, the center of the laser active region. The laser system of present invention may be realized in a laser system of the spinning solid state laser rod type or of the spinning aperture type. Laser apparatuses utilizing spinning solid state laser rods or spinning apertures are the subjects of commonly owned U.S. Pat. Nos. 5,172,388 and 5,233,624, respectively, the disclosures of which are incorporated herein by reference. It will be apparent from the ensuing description that the present invention provides significant improvements over the systems disclosed in the aforementioned patents and the other conventional systems discussed above.

Figure 1:
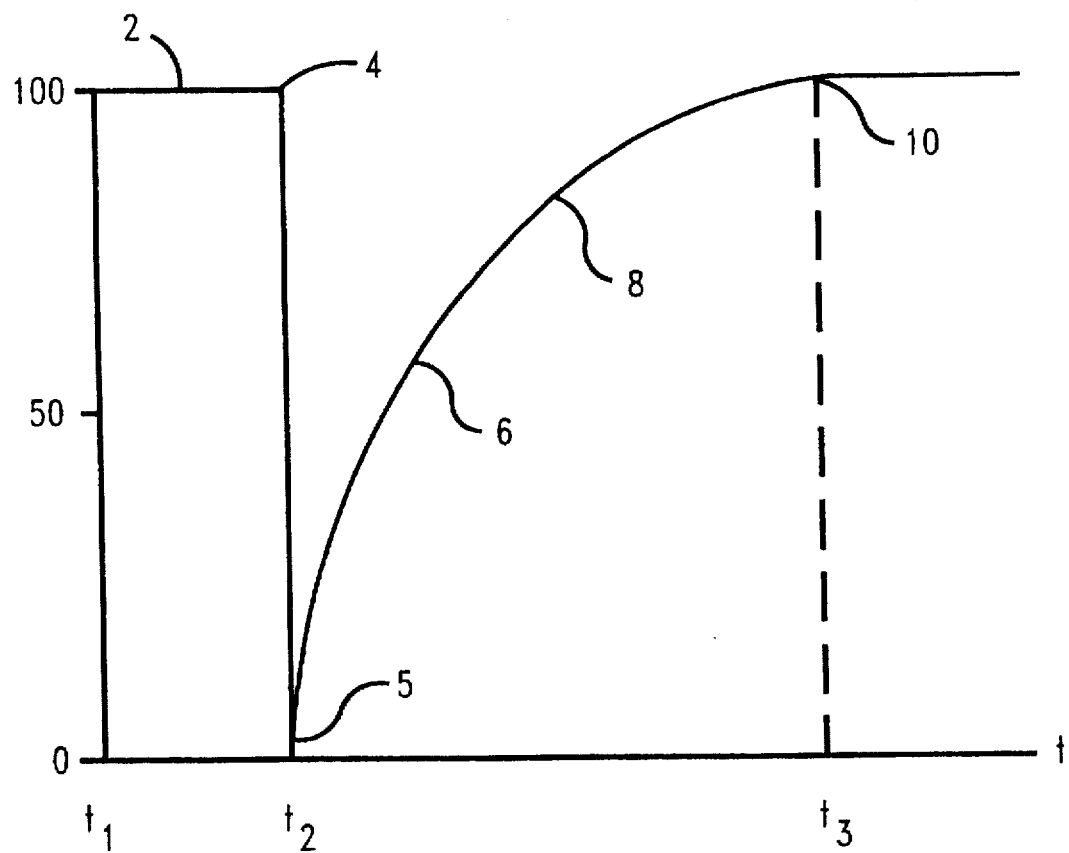
FIG. 1 graphically illustrates charge and discharge time for solid state lasing rods.

It has been found that the maximum repetition rate at maximum peak power of a CW (Continuous Wave) pumped Q-switched Nd:YAG laser occurs at approximately 1 Khz. This maximum repetition rate is primarily due to the fixed maximum pumping rate of a CW pumped laser rod. Referring to FIG. 1, the X-axis represents the pumping time t and the Y-axis represents the pumping of the laser rod from 0 to 100 percent pumping level.

Continuously pumped Q-switched solid state lasers perform in the following manner. At time t1, the laser rod is fully pumped (100%) as indicated by reference numeral 2, and is at maximum population inversion. At time t2, the laser is fired (see reference numeral 4) thereby depleting the solid state laser rod of the stored energy at time t2 (see reference numeral 5). With constant pumping at a maximum rate, the population inversion is partially restored (reference numeral 8 on pumping curve 6) and is fully pumped at time t3 (reference numeral 10). Time t3 is typically about 1 millisecond (msec) for a Nd:YAG laser. In a standard laser system, if the laser is fired before the laser rod is fully repumped, the resulting output pulse of light is less intense than that of a pulse from a fully pumped laser rod. This leads to large variations in output energy for randomly pulsed laser rods and is very undesirable for many laser applications.

Figure 2:
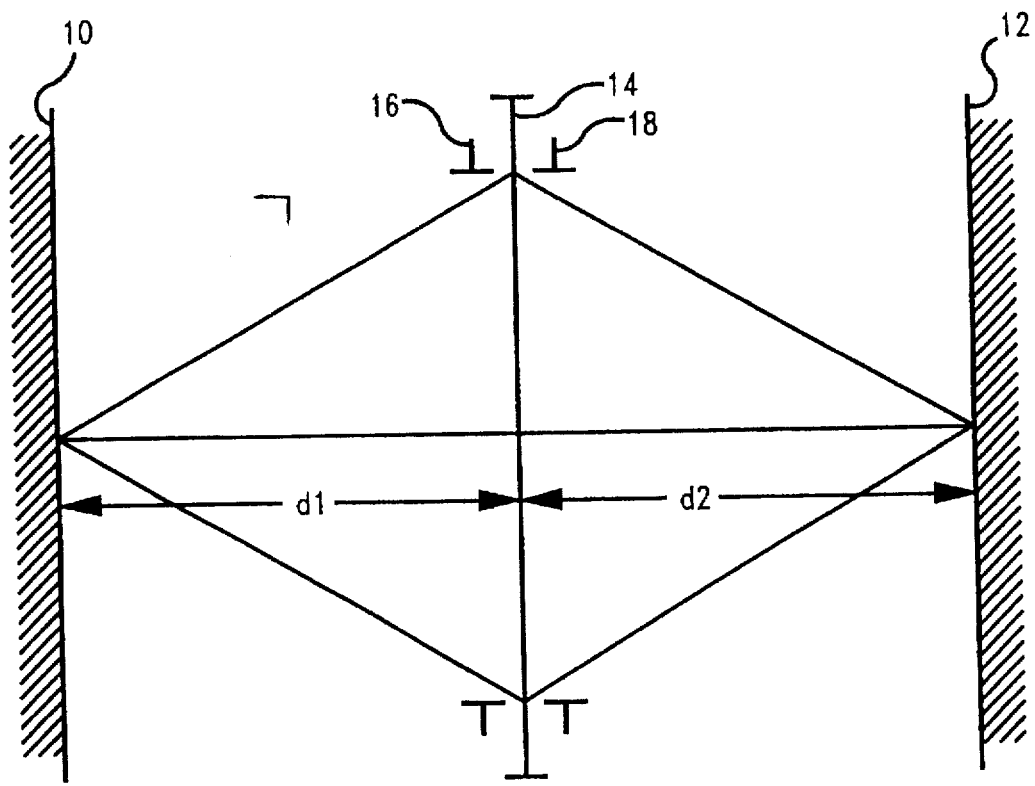
FIG. 2 schematically illustrates a stable laser cavity with an on-axis rod.

FIG. 2 illustrates a stable laser cavity with an on-axis laser rod. In the figure, the length of the optical elements has been reduced to 0 and thin lens approximations have been used. In practice, the length of these elements will be non-zero.

The laser cavity uses two flat mirrors 10,12 and Nd:YAG laser rod 14 that exhibits thermal lensing. Either mirror 10 or 12 could be an output coupler. Mirrors 10 and 12 are placed a distance d1 and d2, respectively, from laser rod 14. Apertures 16 and 18 are placed on-axis, close to laser rod 14. Apertures 16 and 18 are small enough to create a single mode resonator with a Gaussian beam profile. Laser rod 14 acts as a thin lens having a focal length f as a first order approximation and is placed on-axis. The spatial extent of the laser spot at any point in the cavity can be calculated using known ABCD matrix methods (Laser Electronics, J. T. Veerdeyen) and in general is found to be a function of d1, d2 and f.

Figure 3:
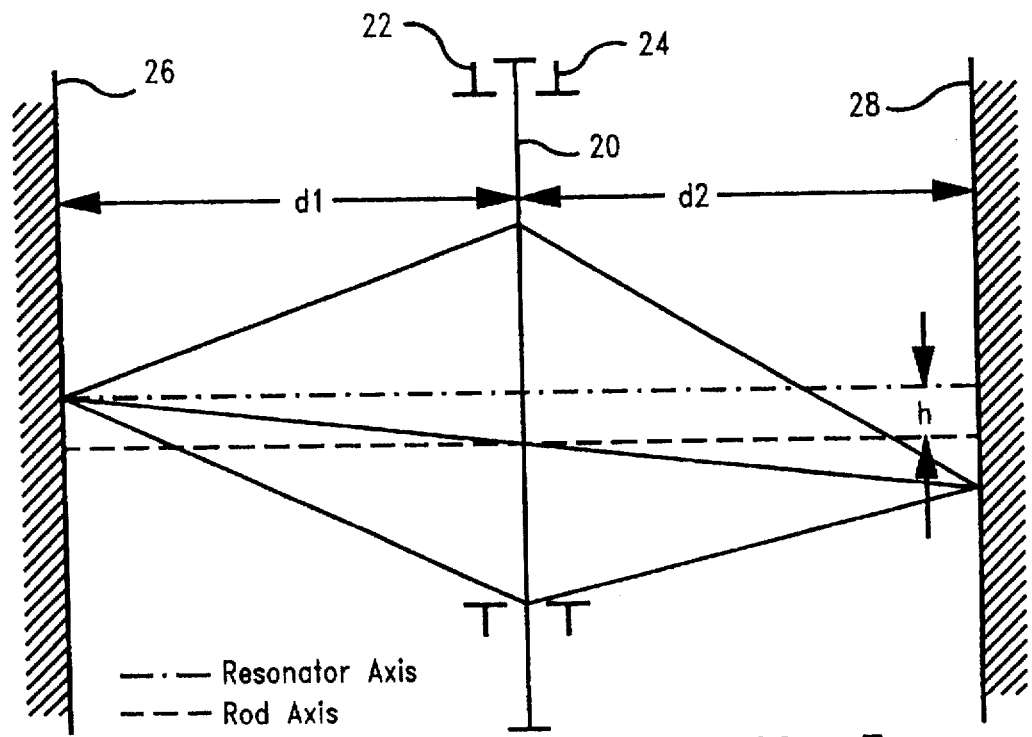
FIG. 3 schematically illustrates a laser cavity with an off-axis rod.

FIG. 3 illustrates a laser resonator with an off-axis laser rod. Laser rod 20 is moved off the axis defined by apertures 22 and 24. This results in a reduction in laser power since the effective stable lasing area is reduced. Mirrors 26 and 28 are displaced from laser rod 20 by distances d1 and d2, respectively. If laser rod 20 is moved far enough, the stable lasing area is reduced to zero and lasing stops. Without correction for thermal lensing, a resonator that is off-axis by more than half the aperture diameter will not be able to lase.

Figure 4:
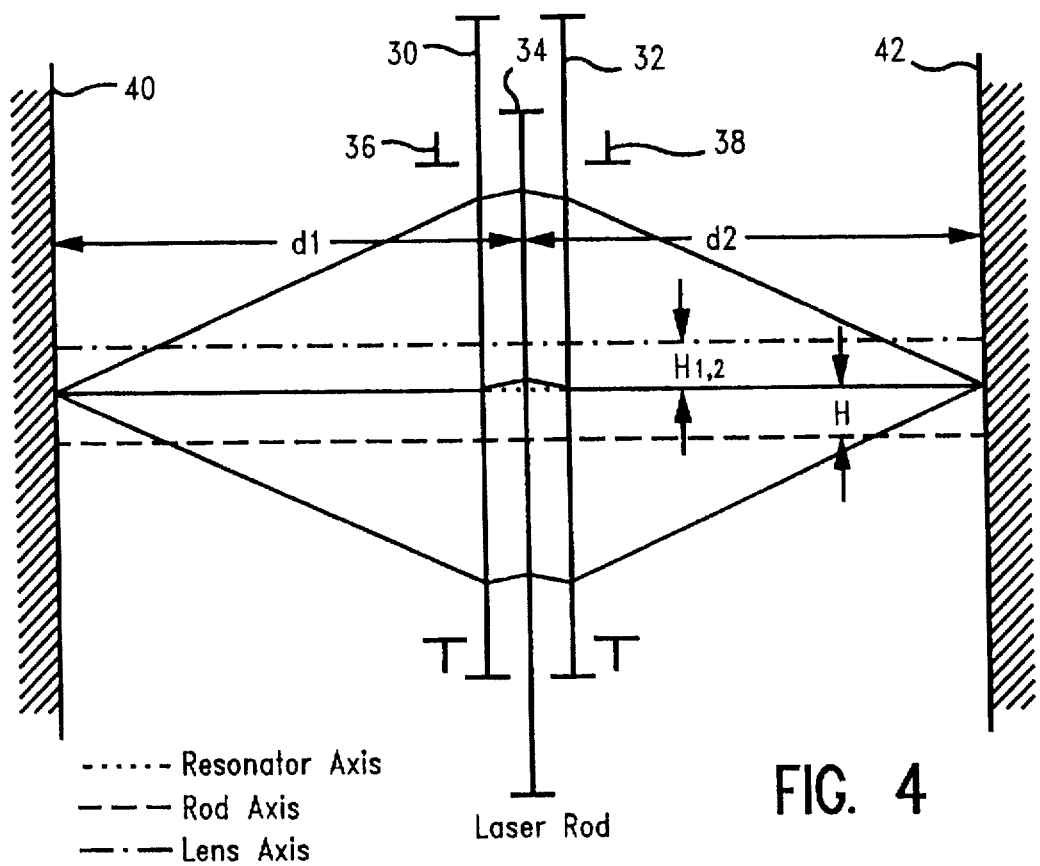
FIG. 4 schematically illustrates an off-axis laser cavity with thermal lensing compensation.

FIG. 4 illustrates a laser resonator in accordance with the present invention. Off-axis lenses 30 and 32 have been added between laser rod 34 and apertures 36 and 38. Mirrors 40 and 42 are displaced from laser rod 34 by distances d1 and d2, respectively. Lenses 30 and 32 function to correct the thermal lensing and maintain the desired lasing area (laser power). The effective focal length of the lens system is different than just laser rod 34. Therefore, the distances d1 and d2 are adjusted appropriately to maintain the same spot size. $H_1$ and $H_2$ are off-axis distances of the off-axis lenses 30, 32 and H is the off-axis distance of the laser rod 34. It has been found that thermal lensing can be corrected if lenses 30 and 32 have focal lengths equal to approximately half the focal length of laser rod 34 and are placed off-axis by the same distance as laser rod 34, but in a direction opposite to laser rod 34. It has also been found that the use of just a single lens can correct thermal lensing. Additionally, it has been found that thermal lensing can be corrected if lenses 30 and 32 have focal lengths approximately equal to negative one-half ($-\frac{1}{2}$) the focal length of laser rod 34 and are placed off-axis by the same distance as laser rod 34 but in the same direction as laser rod 34. Many other lens off-axis distances can be used for other lens focal lengths.

The laser resonator of the present invention provides adjustable thermal lensing compensation. As the pump power to the laser is increased and the effective focal length of the laser rod decreases, the lens or lenses are linearly translated farther away from the resonator axis in order to compensate for the changing degrees of thermal lensing. As shown below, the linear translation is accomplished by mounting the lenses on translation tables. In a preferred embodiment, a look-up table is used to determine the position of the lens or lenses for a specific pump power.

EXAMPLE

A test was conducted to determine the approximate focal length of the laser rod as a function of pump power. A well collimated He-Ne laser beam was directed through the rod. The location of the focal point as a function of pump power was measured. The results are based on a 633 nm wavelength instead of a Nd:YAG laser resonator's wavelength of 1.03 um. The focal length was found to vary from 1150 mm at 24 A pump lamp current to 260 mm at 26 A lamp current.

Figure 5:
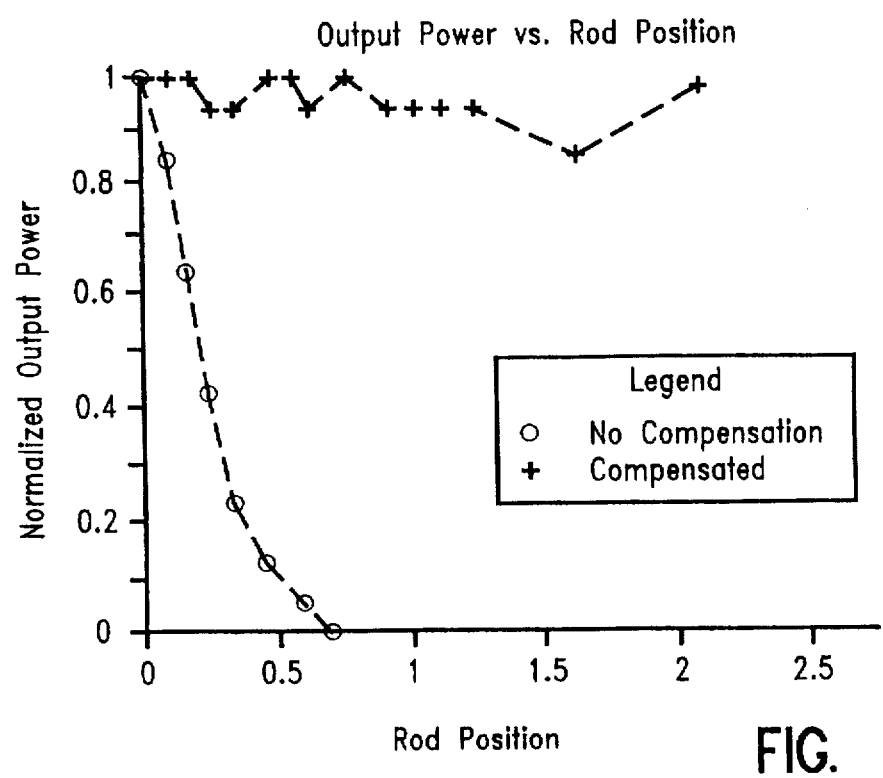
FIG. 5 graphically illustrates output power versus rod position for both an uncompensated and a thermal lensing compensated resonator.

This shows the dramatic variation in lensing over the operating range of the laser. A laser resonator was then configured such that laser rod was mounted on a translation table and a single lens was placed on a separate translation table in close proximity to one end of the laser rod. A single aperture was placed just on the other side of the lens from the rod. With the lens removed from the cavity, the resonator was aligned and then the laser output power was measured as the rod was translated off-axis. FIG. 5 graphically illustrates the results of this test. The output power was reduced to zero when the laser rod was translated about 0.65 mm from the resonator axis for an aperture having a 0.65 mm diameter. The translation distance of 0.65 mm was close to the calculated distance of 0.8 mm which was based on a loss-less cavity with no lasing threshold. The laser resonator was then configured with a 1000 mm focal length lens and the system was re-aligned. The laser output was measured as the laser rod was translated off-axis and the lens moved in the opposite direction. The translational positions of the lens were optimized to yield the highest output power. However, the lenses were typically moved about the same distance as the rod. As shown in FIG. 5, only a 10% drop in output power occurred for a laser rod translation of 2.1 mm. The translation was only limited by the translation stage reaching the end of its travel. The beam quality was also tested using burn paper and showed no visible degradation from the on-axis case.

Thus, in view of the results described in the Example above, a 6 mm rod diameter and 1.6 mm beam diameter would require translation of 2.2 mm to place the active lasing medium at the edge of the laser rod. Rotating the rod about its central axis would effect lasing in the annulus around the outside of the rod. The laser rod could then be spun up to a speed of 60000 rpm and the pulse rate increased up to approximately 10 Khz with no change in the output power thereby providing a 10 X improvement in laser resonator throughput.

Figure 6A:
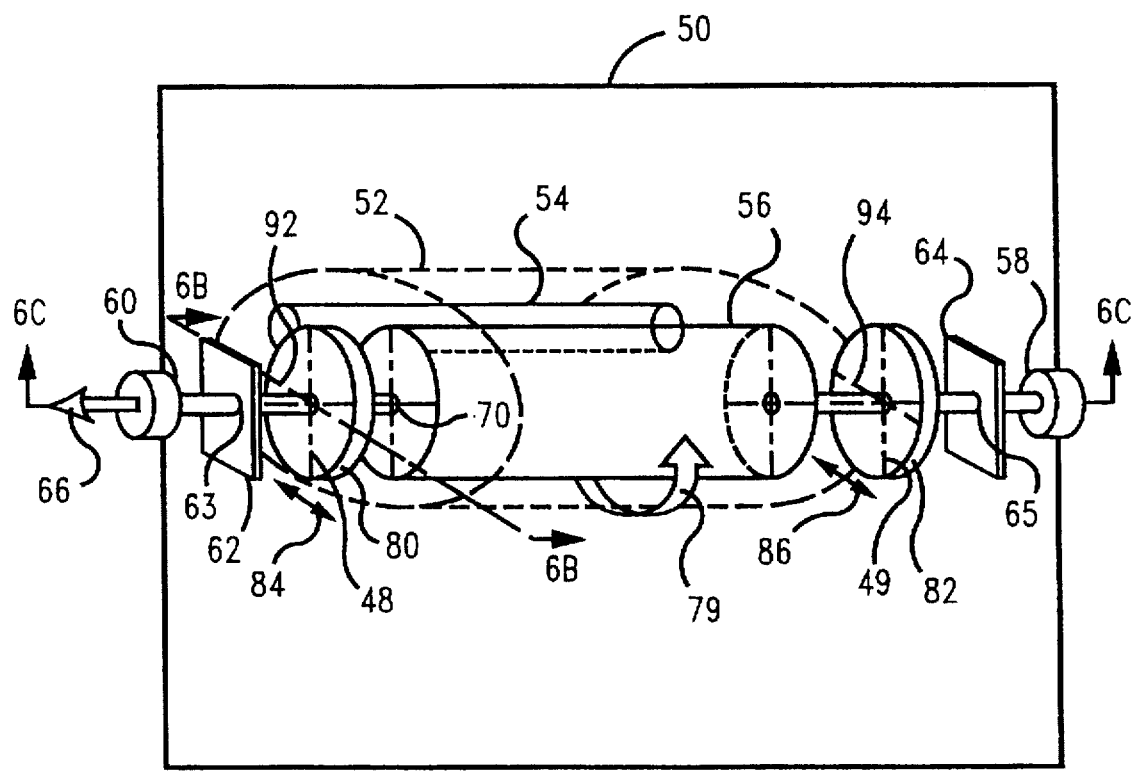
FIG. 6A is a perspective, schematic view of a thermal lensing-compensated spinning laser rod laser apparatus of the present invention.
Figure 6B:
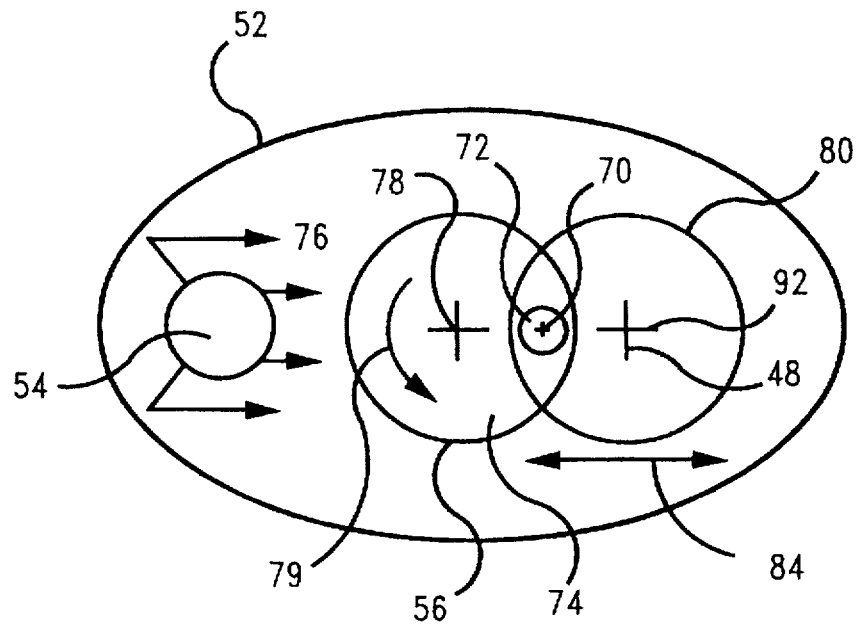
FIG. 6B is a schematic view taken along line 6B—6B in FIG. 6A.
Figure 6C:
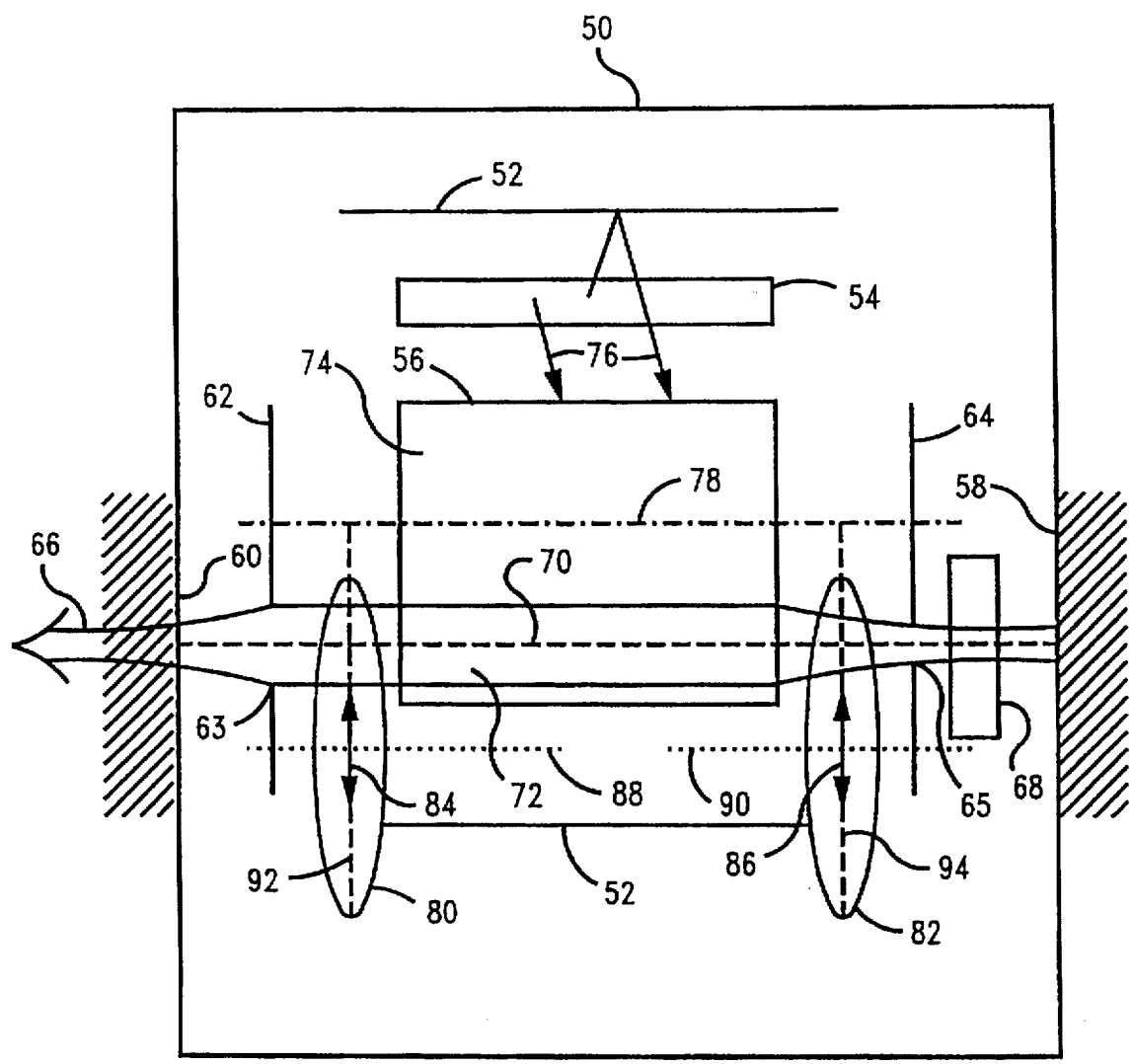
FIG. 6C is a schematic view taken along line 6C—6C in FIG. 6A.

Referring to FIGS. 6A–6C, there is shown a perspective, schematic view of spinning laser cavity 50 of the present invention. Cavity 50 comprises reflector 52, optical pumping source 54 and laser rod 56. Preferably, reflector 52 is a liquid-cooled elliptical reflector and laser rod 56 is a solid state laser rod. Reflector 52 houses optical pumping source 54 and solid state laser rod 56. Optical pump 54 is preferably a CW krypton arc lamp. Cavity 50 includes first or rear mirror 58 and second or front mirror 60. Mirror 60 is an output coupler mirror. Cavity 50 further comprises front plate 62 and rear plate 64. Plates 62 and 64 have apertures 63 and 65, respectively. The functions of mirrors 58 and 60 can be easily interchanged as either mirror can act as the output coupler. Apertures 63 and 65 provide spatial filtering to define the allowable laser beam path in order to produce a gaussian output beam 66. Thus, apertures 63 and 65 define optic axis 70 thereby forming active or lasing region 72 and inactive or non-lasing region 74 in laser rod 56. Laser beam 66 propagates along optical axis 70. Laser rod 56 is spun along its axis of rotation 78 in the direction indicated by arrow 79 (see FIG. 6A).

Referring to FIG. 6C, cavity 50 further comprises lenses 80 and 82 which are mounted to linear translation stages 84 and 86, respectively. Lenses 80 and 82 have central axes 88 and 90, respectively, which may be colinear and may be parallel with optical axis 70. Lenses 80 and 82 also have transverse axes 92 and 94, respectively. Lens 80 is mounted so that its first transverse axis 92 is orthogonal to its central axis 88 and intersects both central axis 88 and optical axis 70. Lens 82 is mounted so that its first transverse axis 94 is orthogonal to central axis 90 and intersects both central axis 90 and optical axis 70. Translation stages 84 and 86 are positioned such that their directions of travel are parallel to the first transverse axes 92 and 94 of lenses 80 and 82, respectively. Lens 80 and 82 may also be slightly tilted about their second transverse axes 48 and 49, respectively to partially compensate for aberrations, such as astigmatism, introduced by the laser rod. In this case, central axes 88 and 90 may not be colinear and will not be parallel with optical axis 70. This adjustment could also be made variable by mounting lens 80 and 82 on rotation stages.

Krypton arc lamp 54 emits pumping radiation, light rays or photons 76 inside elliptical reflector 52 which pump laser rod 56. When laser rod 56 is sufficiently charged, it emits photons toward rear mirror 58. After the photons bounce back to laser rod 56, they are amplified by stimulated emission so as to produce laser beam 66 that exits through front aperture 63 and output coupler mirror 60 (see FIG. 6A). Typically, output coupler mirror 60 allows only about 10 percent of laser beam 66 to pass therethrough. Mirror 60 reflects the remaining light back into laser cavity 50 for further amplification by stimulated emission of photons. Electronically controlled Q-switch 68 (see FIG. 6C) gates beam 66 on and off allowing an output laser pulse to occur. Q-switch 68 controls the passage of laser beam 66 and upon command, allows stimulated laser rod photons to strike rear mirror 58. Laser rod 56 has its axis of rotation 78 off-set from optical axis 70 by at least one radius of active region 72 (see FIG. 6B).

Referring to FIGS. 6B and 6C, active region 72 of pumped laser rod 56 emits photons that pass through lens 82, aperture 65 and Q-switch 68 before reflecting off mirror 58. The photons reflecting off mirror 58 pass back through Q-switch 68, aperture 65 and lens 82 before propagating through active region 74 of laser rod 56. As the photons pass through active region 74, they effect stimulated emission of more photons that propagate in the same direction. The stimulated photons pass through lens 80, aperture 63 and mirror or output coupler 60 to form laser beam 66. However, most of the photons are reflected by output coupler 60 and pass back through aperture 63, lens 80 and re-enter laser rod 56.

Referring again to FIGS. 6B and 6C, the passing of the photons back through active region 74 of laser rod 56 effects stimulated emission of more photons which are directed toward mirror 58. Apertures 63, 65 and lenses 80, 82 cooperate to provide stability of laser cavity 50 whereby stimulated photons continue to be reflected back and forth through apertures 63, 65, lenses 80, 82 and laser rod 56 by mirrors 58 and 60. With each pass through the active region 74, the photons stimulate the reaction of more photons that are coherent with the original photons. Thus, the stimulated photons propagate in the same direction, have the same wavelength and are in phase with the original photons. The stimulated emission of photons continues until the population inversion is depleted or the beam is blocked, by the Q-switch for example, and a successive coherent laser beam is created in laser cavity 50. A portion of the intracavity laser radiation exits through output coupler 60 and laser beam 66 is generated.

Cavity 50 exhibits superior performance in comparison to conventional spinning laser rod cavities described above. Specifically, laser cavity 50 remains stable over a relatively larger range of operating parameters. As discussed above, conventional spinning laser rod cavities are stable only when the laser rod therein is preshaped to compensate for thermal lensing at a specific pumping power. If the pumping power is changed in a conventional spinning laser rod cavity, then a portion of the intracavity laser beam will be blocked by apertures in the corresponding plates and the laser power will be decreased. As the power is changed further, the amount of light passing back through the apertures decreases to a point such that a laser beam cannot be created in the cavity thereby essentially terminating all lasing. On the other hand, if the pumping power is varied in thermal lensing compensated cavity 50 of the present invention, any resulting change in the degree of thermal lensing in laser rod 56 is compensated for by adjusting the transverse position of lenses 80 and 82 using translation stages 84 and 86, respectively. Thus, laser cavity 50 provides compensation for variations in thermal lensing due to changes in pumping power thereby avoiding any degradation in laser power and efficiency of laser cavity 50.

Figure 7:
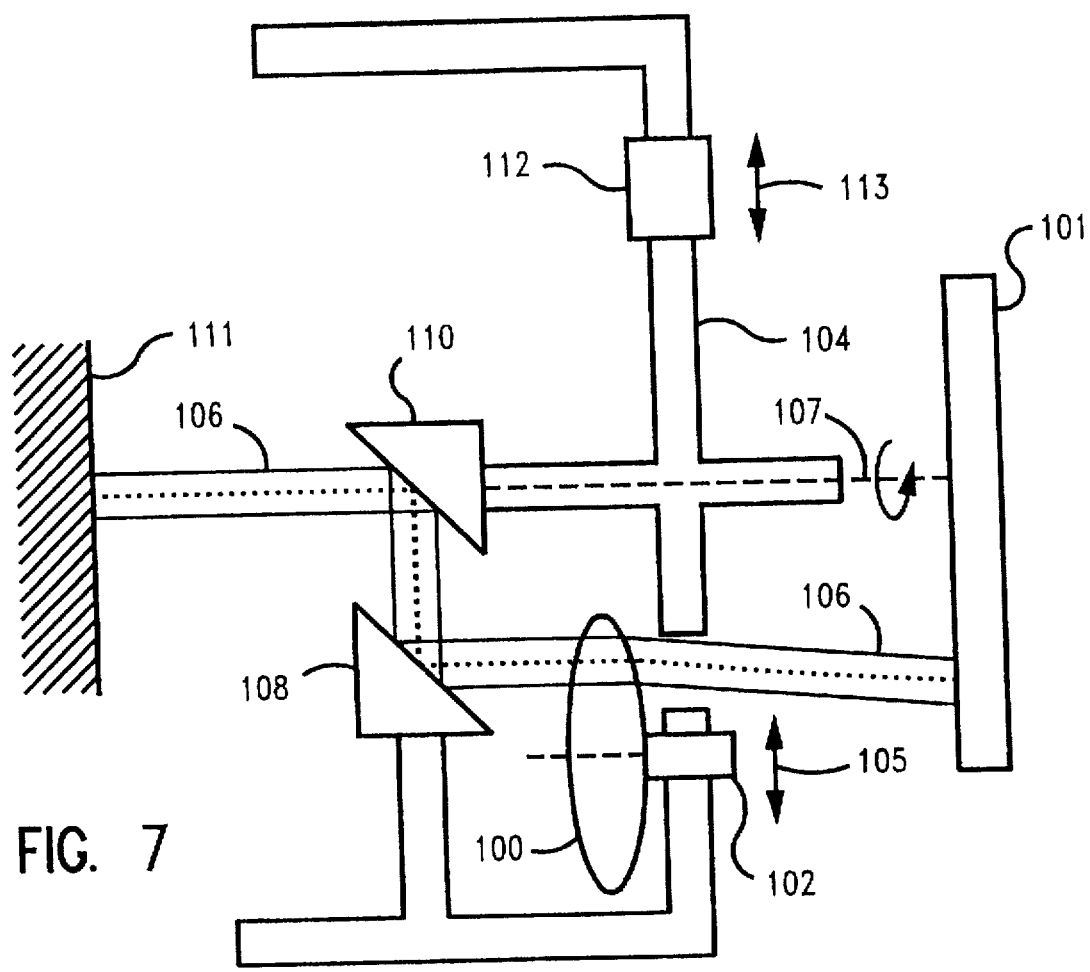
FIG. 7 is a partial, cross-sectional view of a thermal lensing-compensated spinning beam steering laser assembly of the present invention.
Figure 8:
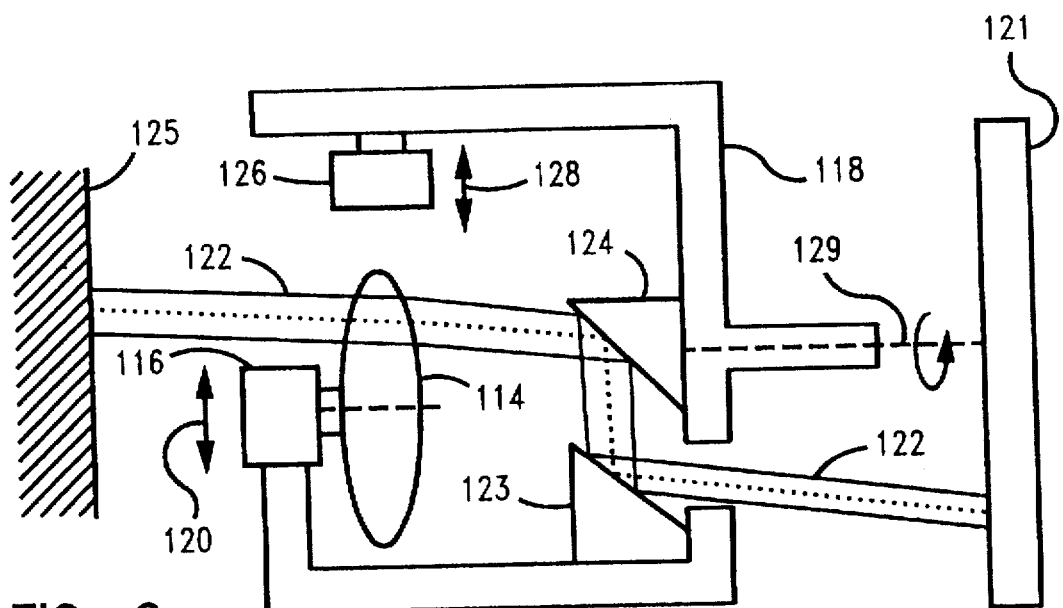
FIG. 8 is a partial, cross-sectional view of an alternate embodiment of the spinning beam steering assembly of FIG. 7.
Figure 9:
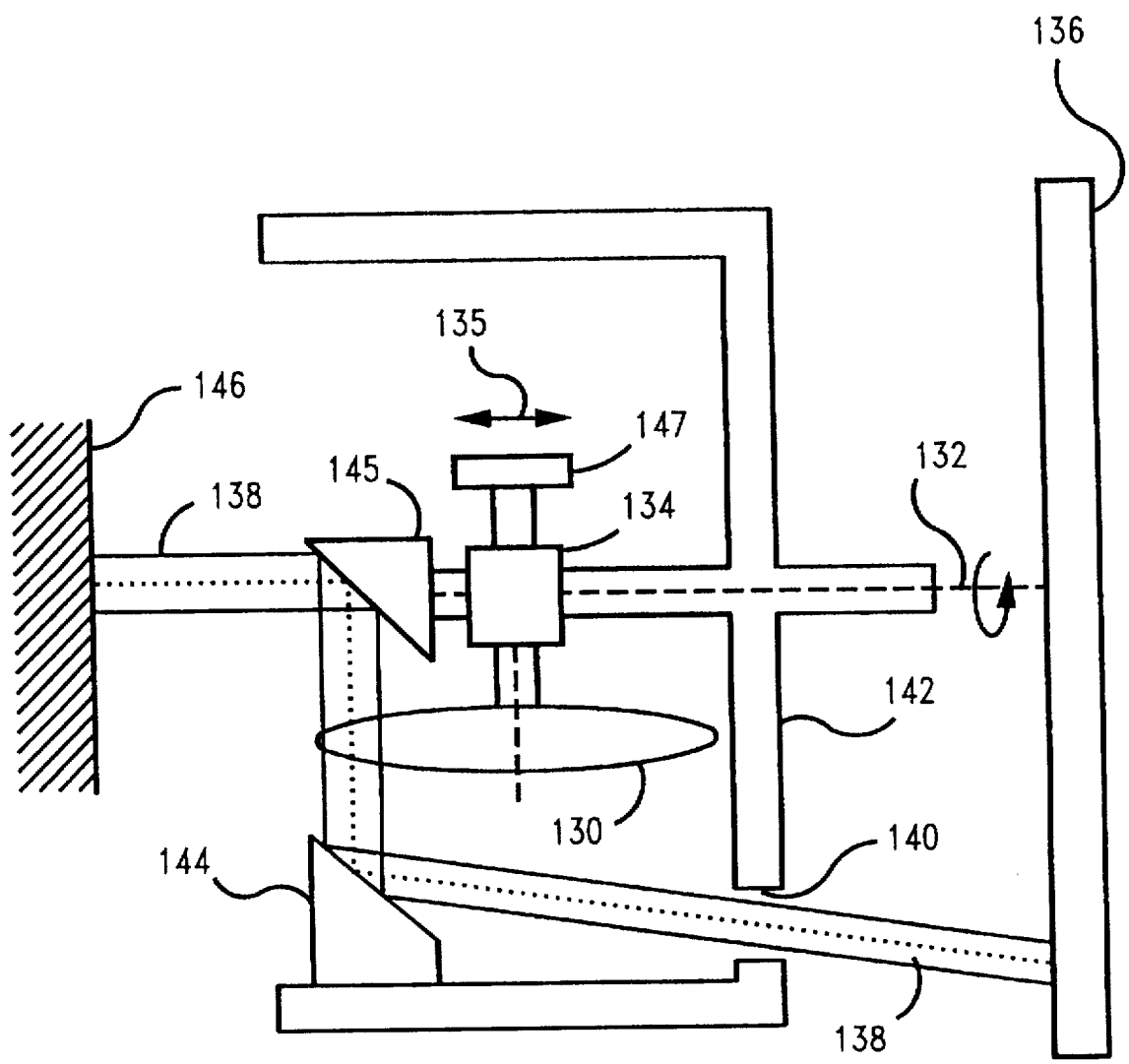
FIG. 9 is a partial, cross-sectional view of a further embodiment of the thermal lensing-compensated spinning beam steering assembly of FIG. 7.

The present invention can also be used on SBSA (spinning beam steering assemblies). FIGS. 7–9 illustrate how the lens configuration of the present invention can be used in SBSAs in order to provide compensation for thermal lensing. In all cases, a lens is positioned in the beam path to compensate for the thermal lensing effects of the laser rod. Each lens can be adjusted to compensate for thermal lensing effects resulting from the use of varying pump levels.

Referring to FIG. 7, the SBSA includes lens 100 that is attached to adjustable mount 102 which is slidably mounted to housing 104 and can move in the direction indicated by arrow 105. Laser medium 101 emits laser beam 106 which passes through lens 100 and is reflected upward by about 90° by prism or reflector 108. Laser beam 106 is coaxial with rotational axis 107. Prism or reflector 110 reflects laser beam 106 laterally by about 90 degrees so as to direct laser beam 106 to mirror 111. The SBSA also includes counterweight 112 which is slidably attached to housing 104 such that it can slide in the direction indicated by arrow 113. When lens 100 is adjusted radially, counterweight 112 is radially adjusted to compensate for any change in centripetal force due to the adjustment in lens 100. Thus, as lens 100 is adjusted toward rotational axis 107 of the SBSA to compensate for the thermal lensing, counterweight 112 is likewise adjusted toward the rotational center 107.

Referring to FIG. 8, the SBSA includes lens 114 that is attached to adjustable mount 116 that is slidably mounted to housing 118. Mount 116 can move in the direction indicated by arrow 120. Laser medium 121 emits laser beam 122. Beam 122 is reflected upward by prism or reflector 123. Prism or reflector 124 directs beam 122 through lens 114 and to mirror 125. Lens 114 is mounted in a manner such that it acts on the portion of laser beam 122 and is adjusted to compensate for thermal lensing. Counterweight 126 is adjusted in a direction indicated by arrow 128 to compensate for the changes in centripetal force caused by the adjustment of lens 114. Lens 114 can have a diameter substantially larger than that of lens 100 shown in FIG. 7. In certain applications, lens 114 can be positioned outside SBSA housing 118. Additionally, lenses can be cut off to include only portions used. The portion of laser beam 122 that propagates to and from mirror 125 may not be coaxial with rotational axis 129. The output beam may then trace out a small annulus as the SBSA spins.

Referring to FIG. 9, illustrates another embodiment of a SBSA incorporating a thermal lensing compensation lens. Lens 130 is mounted about rotational axis 132 of the SBSA via adjustable mount 134 which moves according to arrow 135. Lens 130 is adjusted in a direction longitudinal to rotational axis 132. Laser medium 136 emits laser beam 138 which passes through aperture 140 in housing 142. Beam 138 is directed by prism or reflector 144 through lens 130. Prisms or reflector 145 then directs laser beam 138 to mirror 146. Counterweight 147 may be integral to the lens mount 134 since it is only necessary to translate in the same direction (indicated by arrow 135) as lens 130. Mount 134 can be adjusted while the SBSA is spinning using an external operating mechanism. The portion of laser beam 138 that propagates to and from mirror 146 may not be coaxial with rotational axis 132. The output beam may then trace out a small annulus as the SBSA spins.

One significant advantage of the thermal lensing compensated SBSAs shown in FIGS. 7-9 over conventional spinning beam steering assembly cavities is that the SBSAs of FIGS. 7–9 are stable over a much larger range of operation parameters. As discussed previously, the standard SBSA cavity is stable only when the laser rod is pre-shaped to compensate for thermal lensing at a specific pumping power. If the pumping power is varied or adjusted, then the laser beam will be at least partially blocked by the aperture in the front plate and the laser power will be decreased. As the power is further varied, the amount of light that passes back through the aperture will decrease to the point that no laser beam will be produced in the cavity and lasing will essentially stop. On the other hand, when pumping power is varied in cavity of the SBSA of FIGS. 7–9, the resulting variation in the degree of thermal lensing in the laser rod is corrected by adjusting the transverse position of the thermal compensation lens.

While the present invention has been particularly described, in conjunction with a specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. In a laser cavity having an optical axis, a laser medium for forming a laser beam, the laser medium having a central axis off-set from the optical axis, the laser medium exhibiting focusing characteristics that vary with changes in optical power pumped into the laser medium, at least one pair of mirrors oppositely positioned for reflecting at least a portion of the laser beam, one of the mirrors being an output coupler, the laser cavity further comprising at least one focusing element having a central axis positioned between one of the mirrors and the laser medium such that the central axis of the focusing element is displaced from the optical axis a distance that is a function of the displacement of the laser medium central axis from the optical axis and the optical axis passes through the focusing element to substantially eliminate lensing effects produced by the laser medium.

2. The laser cavity as set forth in claim 1 wherein the focusing element is positioned such that its central axis is displaced from the optical axis in the same direction as the displacement of the laser medium central axis from the optical axis.

3. The laser cavity as set forth in claim 1 wherein the focusing element is positioned such that its central axis is displaced from the optical axis in a direction opposite that of the displacement of the laser medium central axis from the optical axis.

4. The laser cavity as set forth in claim 1 wherein the focusing element is a lens.

5. The laser cavity as set forth in claim 4 further comprising a rotation stage for tilting the lens to compensate for aberrations introduced by the laser medium.

6. The laser cavity as set forth in claim 1 wherein the focusing element comprises two focusing elements, each focusing element being positioned between a corresponding mirror and the laser medium.

7. The laser cavity as set forth in claim 6 wherein each focusing element is a lens, each lens being positioned such that its central axis is displaced from the optical axis in the same direction as the displacement of the laser medium central axis from the optical axis.

8. The laser cavity as set forth in claim 6 wherein each focusing element is a lens, each lens being positioned such that its central axis is displaced from the optical axis in a direction opposite that of the displacement of the laser medium central axis from the optical axis.

9. The laser cavity as set forth in claim 6 wherein each focusing element is a lens, one of the lenses being positioned such that its central axis is displaced from the optical axis in the same direction as the displacement of the laser medium central axis from the optical axis, and the other lens being positioned such that its central axis is displaced from the optical axis in a direction opposite that of the displacement of the laser medium central axis from the optical axis.

10. The laser cavity as set forth in claim 1 further comprising means for rotating the laser medium.

11. The laser cavity as set forth in claim 1 wherein the laser medium comprises a laser rod having a rotational axis set-off from optical axis by at least one laser beam radius.

12. The laser cavity as set forth in claim 1 further comprising at least one aperture defining the diameter of the laser beam, wherein the optical axis passes through the center of the aperture, the pair of mirrors and the focusing element.

13. The laser cavity as set forth in claim 1 wherein the laser medium is a laser rod.

14. The laser cavity as set forth in claim 13 wherein the laser rod is a solid state laser rod.

15. The laser cavity as set forth in claim 1 further comprising an optical pumping source for optically pumping at least a portion of the laser medium wherein the pumping effects a population inversion in at least a portion of the laser medium.

16. The laser cavity as set forth in claim 15 wherein the optical pumping source comprises at least one arc lamp.

17. The laser cavity as set forth in claim 15 wherein the optical pumping source comprises at least one laser diode.

18. The laser cavity as set forth in claim 15 wherein the optical pumping source comprises a reflector.

19. The laser cavity as set forth in claim 15 further comprising a device for sweeping the allowable laser beam path through the population inverted region of the laser medium.

20. The laser cavity as set forth in claim 15 wherein the device for sweeping the allowable laser beam path is at least one spinning beam steering assembly.

21. The laser cavity as set forth in claim 20 wherein at least a portion or one end of the laser medium is optically pumped and wherein the optically pumped radiation passes through at least a portion of the spinning beam steering assembly.

22. The laser cavity as set forth in claim 20 wherein the spinning beam steering assembly includes at least one means to re-direct at least a portion of the laser beam.

23. The laser cavity as set forth in claim 20 wherein the means to re-direct at least a portion of the laser beam is a prism.

24. The laser cavity as set forth in claim 20 wherein the means to re-direct at least a portion of the laser beam is at least a pair of mirrors.

25. The laser cavity as set forth in claim 1 wherein the laser medium comprises a lasing portion and a non-lasing portion, and wherein at least a portion of the non-lasing portion is continuously pumped by the optical pumping source.

26. The laser cavity as set forth in claim 25 wherein at least a portion of the laser medium is pumped while at least a portion of the laser medium lases simultaneously.

27. The laser cavity as set forth in claim 1 further comprising an aperture for defining an allowable laser beam path, the laser beam path being smaller than the cross-section of the laser medium.

28. The laser cavity as set forth in claim 27 wherein the aperture is an integral part of at least one spinning beam steering assembly.

29. The laser cavity as set forth in claim 27 wherein the aperture is a variable aperture.

30. A laser resonator, comprising:
  a laser rod for forming a laser beam, the laser rod having a rotational axis and a laser beam optical axis, the optical axis being set-off from the rotational axis by at least one laser beam radius;
  an optical pumping source for optically pumping at least a portion of the laser rod;
  a device for rotating the laser rod;
  at least one pair of oppositely positioned mirrors for reflecting at least a portion of the laser beam, one of the mirrors being an output coupler;
  at least one aperture defining the diameter of the laser beam;
  at least one focusing element positioned between one of the mirrors and the laser rod such that its central axis is displaced from the optical axis a distance that is a function of the displacement of the laser rod rotational axis from the optical axis; and
  wherein the optical axis passes through the center of the aperture, the mirrors and the focusing element to form a laser resonator.

31. The laser cavity as set forth in claim 30 wherein the focusing element is positioned such that its central axis is displaced from the optical axis in the same direction as the displacement of the laser medium central axis from the optical axis.

32. The laser cavity as set forth in claim 30 wherein the focusing element is positioned such that its central axis is displaced from the optical axis in a direction opposite that of the displacement of the laser medium central axis from the optical axis.

33. The laser cavity as set forth in claim 30 wherein the at least one focusing element comprises two focusing elements, each focusing element being positioned between a corresponding mirror and the laser medium.

34. The laser cavity as set forth in claim 30 wherein the focusing element is a lens.

35. The laser cavity as set forth in claim 33 wherein each focusing element is a lens, each lens being positioned such that its central axis is displaced from the optical axis in the same direction as the displacement of the laser medium central axis from the optical axis.

36. The laser cavity as set forth in claim 33 wherein each focusing element is a lens, one of the lenses being positioned such that its central axis is displaced from the optical axis in the same direction as the displacement of the laser medium central axis from the optical axis, and the other lens being positioned such that its central axis is displaced from the optical axis in a direction opposite that of the displacement of the laser medium central axis from the optical axis.

37. The laser cavity as set forth in claim 34 further comprising means for tilting the lens to compensate for aberrations introduced by the laser rod.

38. The laser cavity as set forth in claim 30 wherein the laser medium comprises a laser rod having a rotational axis set-off from optical axis by at least one laser beam radius.

39. The laser cavity as set forth in claim 30 further comprising at least one aperture defining the diameter of the laser beam, wherein the optical axis passes through the center of the aperture, the pair of mirrors and the focusing element.

40. The laser cavity as set forth in claim 30 further comprising an optical pumping source for optically pumping at least a portion of the laser medium wherein the pumping effects a population inversion in at least a portion of the laser medium.

41. The laser cavity as set forth in claim 30 wherein the laser medium comprises a lasing portion and a non-lasing portion, and wherein at least a portion of the non-lasing portion is continuously pumped by the optical pumping source.

42. The laser cavity as set forth in claim 41 wherein at least a portion of the laser medium is pumped while at least a portion of the laser medium lases simultaneously.

43. A laser cavity having an optical axis, comprising:
- at least one laser medium having a central axis, the laser medium forming a laser beam having a laser beam axis;
- at least one optical pumping source for pumping at least a portion of the laser medium wherein the pumping causes a population inversion in at least a portion of the laser medium;
- at least one aperture for defining an allowable laser beam path that is smaller than the cross-section of the laser medium;
- a device for sweeping the allowable laser beam path through the population inverted region of the laser medium;
- a pair of oppositely positioned mirrors for reflecting a portion of the laser beam, one of the mirrors being an output coupler; and
- at least one focusing element having a central axis positioned between one of the mirrors and the laser medium such that the central axis of the focusing element is displaced from the optical axis a distance that is a function of the displacement of the laser medium central axis from the optical axis and the optical axis passes through the focusing element to substantially eliminate lensing effects produced by the laser medium;
- wherein the laser beam passes through the aperture, partially reflects off a portion of each mirror during the sweeping of the population inversion region of the laser medium and passes through the focusing element.

44. The laser cavity as set forth in claim 43 wherein the focusing element is positioned such that its central axis is displaced from the optical axis a distance in the same direction as the displacement of the laser medium central axis from the optical axis.

45. The laser cavity as set forth in claim 43 wherein the focusing element is positioned such that its central axis is displaced from the optical axis in a direction opposite that of the displacement of the laser medium central axis from the optical axis.

46. The laser cavity as set forth in claim 43 wherein the focusing element comprises two focusing elements, each focusing element being positioned between a corresponding mirror and the laser medium.

47. The laser cavity as set forth in claim 46 wherein each focusing element is a lens, each lens being positioned such that its central axis is displaced from the optical axis in the same direction as the displacement of the laser medium central axis from the optical axis.

48. The laser cavity as set forth in claim 46 wherein each focusing element is a lens, each lens being positioned such that its central axis is displaced from the optical axis in a direction opposite that of displacement of the laser medium central axis from the optical axis.

49. The laser cavity as set forth in claim 46 wherein each focusing element is a lens, one of the lenses being positioned such that its central axis is displaced from the optical axis in the same direction as the displacement of the laser medium central axis from the optical axis, and the other lens being positioned such that its central axis is displaced from the optical axis in a direction opposite that of the displacement of the laser medium central axis from the optical axis.

50. The laser cavity as set forth in claim 43 wherein the focusing element is a lens.

51. The laser cavity as set forth in claim 50 further comprising means for tilting the lens to compensate for aberrations introduced by the laser rod.

52. The laser cavity as set forth in claim 43 wherein the laser medium comprises a lasing portion and a non-lasing portion, and wherein at least a portion of the non-lasing portion is continuously pumped by the optical pumping source.

53. The laser cavity as set forth in claim 52 wherein at least a portion of the laser medium is pumped while at least a portion of the laser medium lases simultaneously.

54. The laser cavity as set forth in claim 43 wherein the aperture is an integral part of at least one spinning beam steering assembly.

55. The laser cavity as set forth in claim 43 wherein the aperture is a variable aperture.

56. The laser cavity as set forth in claim 43 wherein the device for sweeping the allowable laser beam path is at least one spinning beam steering assembly.

57. The laser cavity as set forth in claim 43 wherein at least a portion or one end of the laser medium is optically pumped and wherein the optically pumped radiation passes through at least a portion of the spinning beam steering assembly.

58. The laser cavity as set forth in claim 43 wherein the spinning beam steering assembly includes at least one means to re-direct at least a portion of the laser beam.

59. A method of operating a laser cavity, comprising the steps of:
a) rotating a laser rod having an optical axis and a rotational axis, the optical axis being displaced from the rotational axis by at least one radius of a laser beam;
b) optically pumping at least a portion of the rotating laser rod such that a portion of the laser rod is lasing and forming the laser beam while at least a portion of a non-lasing portion of the rotating laser rod is being optically pumped;
c) reflecting at least a portion of the laser beam with at least a pair of mirrors, one of the mirrors being an output coupler mirror; and
d) allowing the reflected laser beam to pass through at least one exit aperture and at least one focusing element positioned between one of the mirrors and the laser rod, the focusing element having a central axis and being displaced from the optical axis a distance that is a function of the displacement of the laser rod central axis from the optical axis, the focusing element substantially eliminating lensing effects produced by the laser rod.

60. The method as set forth in claim 59 wherein the focusing element is positioned such that its central axis is displaced from the optical axis in the same direction as the displacement of the laser medium central axis from the optical axis.

61. The method as set forth in claim 59 wherein the focusing element is positioned such that its central axis is displaced from the optical axis in a direction opposite that of the displacement of the laser medium central axis from the optical axis.

62. The method as set forth in claim 59 wherein the focusing element comprises two focusing elements, each focusing element being positioned between a corresponding mirror and the laser medium.

63. The method as set forth in claim 59 wherein the focusing element is a lens.

64. The method as set forth in claim 59 further comprising the step of tilting the focusing element to compensate for aberrations introduced by the laser rod.

65. A method of operating a laser cavity comprising the steps of:

a) rotating at least one spinning beam steering assembly having an offset axis and a rotational axis wherein the offset axis is displaced from the rotational axis by at least one radius of a laser beam;

b) pumping at least a portion of a laser medium to effect a population inversion in at least a portion of the laser medium and wherein at least a portion of the laser medium is lasing and forming the laser beam, while at least a portion of a non-lasing portion of the laser medium is being pumped to cause the population inversion;

c) defining with an aperture an allowable laser beam path that is smaller than the cross-section of the laser medium;

d) reflecting at least a portion of the laser beam with at least a pair of mirrors, one of the mirrors being an output coupler mirror; and e) allowing the reflected laser beam to pass through at least one exit aperture and a focusing element positioned between one of the mirrors and the laser medium, the focusing element having a central axis and being displaced from the optical axis a distance that is a function of the displacement of the laser medium central axis from the optical axis, the focusing element substantially eliminating lensing effects produced by the laser medium.

66. The method as set forth in claim 65 wherein the focusing element is positioned such that its central axis is displaced from the optical axis in the same direction as the displacement of the laser medium central axis from the optical axis.

67. The method as set forth in claim 65 wherein the focusing element is positioned such that its central axis is displaced from the optical axis in a direction opposite that of the displacement of the laser medium central axis from the optical axis.

68. The method as set forth in claim 65 wherein the focusing element comprises two focusing elements, each focusing element being positioned between a corresponding mirror and the laser medium.

69. The method as set forth in claim 65 further comprising the step of tilting the focusing element to compensate for aberrations introduced by the laser medium.

* * * * *